United States Patent [19]

Gauthier et al.

[11] Patent Number: 5,740,338
[45] Date of Patent: Apr. 14, 1998

[54] METHOD FOR MERGING VARIABLE IMAGE DATA INTO A TEMPLATE IMAGE

[75] Inventors: Forrest P. Gauthier, Maineville; Dimitrije L. Jovic, Cincinnati, both of Ohio

[73] Assignee: Varis Corporation, Mason, Ohio

[21] Appl. No.: 629,966

[22] Filed: Apr. 9, 1996

Related U.S. Application Data

[63] Continuation of Ser. No. 558,007, Nov. 13, 1995.
[51] Int. Cl.$^6$ ...................................... G09G 5/36
[52] U.S. Cl. .................. 395/116; 395/114; 395/101; 345/509; 345/526; 345/511
[58] Field of Search .................... 395/501–526, 395/101, 102, 106, 109, 111, 114, 115, 116, 117

[56] References Cited

U.S. PATENT DOCUMENTS

| | | | |
|---|---|---|---|
| 4,965,748 | 10/1990 | Chang et al. | 364/519 |
| 4,992,956 | 2/1991 | Kaku et al. | 364/519 |
| 5,043,749 | 8/1991 | Punater et al. | 346/153 |
| 5,084,831 | 1/1992 | Morikawa et al. | 395/116 |
| 5,104,245 | 4/1992 | Oguri et al. | 400/68 |
| 5,136,316 | 8/1992 | Punater et al. | 346/153 |
| 5,150,455 | 9/1992 | Morikawa et al. | 395/114 |
| 5,157,765 | 10/1992 | Birk et al. | 395/506 |
| 5,157,773 | 10/1992 | Matsumoto et al. | 395/375 |
| 5,237,655 | 8/1993 | Statt et al | 395/504 |
| 5,261,047 | 11/1993 | Rivshin | 395/163 |
| 5,276,799 | 1/1994 | Rivshin | 395/162 |
| 5,282,269 | 1/1994 | Willems et al. | 395/164 |
| 5,303,341 | 4/1994 | Rivshin | 395/162 |
| 5,307,458 | 4/1994 | Freiburg et al. | 395/503 |
| 5,349,647 | 9/1994 | Freiburg et al. | 395/115 |
| 5,367,673 | 11/1994 | Goldsmith et al. | 395/600 |
| 5,420,696 | 5/1995 | Wegeng et al. | 358/408 |
| 5,465,165 | 11/1995 | Tanio et al. | 358/448 |

*Primary Examiner*—Raymond J. Bayerl
*Assistant Examiner*—U. Chauhan
*Attorney, Agent, or Firm*—Thompson Hine & Flory LLP

[57] ABSTRACT

A method and architecture is provided for merging a variable image data bitmap into a template image and for transmitting the merged image to a print engine; where the template image is defined by rendering commands derived from a page description language, and the variable image data bitmap is taken from a list of the variable data bitmaps. The method comprises the steps of continuously rendering template image data bands, in accordance with the set of rendering commands, and transferring the template image data bands to a mass storage. Once the entire template image is stored in the mass storage, the variable image data bitmap is merged with the template image bitmap and sent to the print engine by continuously loading template image data bands from the mass storage, logically mapping the variable image data bitmap into the template image data bands to produce merged image data bands, and dispatching the merged image data bands to the print engine. Preferably the loading, mapping and dispatching steps are performed for each variable image bitmap in the list to thus print a corresponding plurality of the templates having respective variable data printed therewith.

14 Claims, 5 Drawing Sheets

METHOD FOR MERGING VARIABLE IMAGE DATA INTO A TEMPLATE IMAGE

CROSS REFERENCE TO RELATED APPLICATIONS

This application is a continuation of application Ser. No. 08/558,007 Filed Nov. 13, 1995.

BACKGROUND

The present invention relates to a system architecture for processing a raster page-map or a bit-map, broken up into image data bands, for a high-speed printing system, and more particularly, to a system architecture for mapping and dispatching raster page-map data in which the speed of the raster image processor is optimized.

The printing industry has undergone significant advances in recent years, to the point that a print engine in a high speed printing system now has the capability to print several pages per second. Printing technology has also advanced to the point that printing capabilities are no longer limited by the print engine speed, but rather by the amount of processing time required by the print controllers. Furthermore as the raster printer controllers move into the field of variable data printing, in which each page map shares a common background, and at least one set of image data bits changes for each page, the processing and dispatching times of such page maps becomes increasingly significant.

One known raster printer controller utilizes a massive hard drive in conjunction with its architecture. This controller merges boiler plate bit-map images with variable data for a long period of time, i.e., all night, merging the variable information with the static information, and then stores the processed images in the massive hard drive. This is a continuous operation which is performed until all of the page maps have been generated and stored in the massive hard drive. Subsequently, i.e., the next day, the finished bit-map pages are processed again and dispatched to the print engine. The disadvantages with such a system are that the image bit-map generation must be processed in a non-realtime operation (i.e. overnight); printing and electronic bit-map rendering cannot be performed simultaneously; and the architecture does not lend itself to re-"ripping" (raster image processing) pages while the system is printing. Therefore, it is desirable to have a system architecture which allows for a truly duplex operation, using a single image processor, such that it allows for the modification of page-map data to be conducted simultaneously with the transmission of the processed page-maps to the print engines. It is desired to have a system that can provide real-time processing of variable page images during the printing operation. Furthermore, it is desirable to have a system architecture which allows for the fine-grain banding of the of the page-maps as opposed to the typical software banding techniques.

SUMMARY OF THE INVENTION

The present invention provides a high-speed printer controller architecture which greatly reduces the processing time required to process page-map data with or without variable data fields.

In accordance with the present invention, a printer controller architecture is provided for processing contiguous blocks of raster page-map data ("image data bands") and for eventually transmitting the image data bands to a raster printer engine. The architecture comprises a central processing unit and a dual port memory device. The dual port memory device has a dynamic band RAM, separated into segments, for storing a plurality of image data bands. The dual port memory device also has a serial access memory for storing one image data band, or a fractional envelope thereof.

The system architecture also comprises means, initiated by the central processing unit, for performing logical operations on an image data band in the dynamic band RAM ("MAPPING"); and means, initiated by the central processing unit, for transferring another image data band from the serial access memory to the raster printer engine ("DISPATCHING"). The system architecture is specifically configured to perform the MAPPING and the DISPATCHING operations in parallel.

The system architecture also comprises a memory device for storing a multitude of image data bands; a means, initiated by the central processing unit, for transferring an image data band between the dynamic band RAM and the serial access memory ("PASSING"); a means, initiated by the central processing unit, for transferring an image data band from the memory device to the serial access memory ("LOADING"); a means, initiated by the central processing unit, for transferring an image data band from the serial access memory to the memory device ("STORING"); and a translation look aside buffer for translating a logical address of an image data band in the memory device, sent by the central processing unit, into a physical address of the dynamic band RAM to which that particular image data band has been loaded and delivered. The DISPATCH means is further configured to DISPATCH an image data band from the memory device to the raster printer.

This architecture is specifically configured to allow for the MAPPING of image data bands in band RAM to occur simultaneously with the DISPATCHING of image data bands from the serial access memory to the marking engines, or from the mass storage device to the marking engines. Furthermore, use of this architecture is also specifically configured to allow for the MAPPING of image data bands in band RAM to occur simultaneously with the STORING or LOADING or image data bands.

Accordingly, it is an object of the present invention to provide hardware controlled fine-grained banding mechanism which optimizes the processing speed of page-map images; by eliminating the need to wait for a band to be DISPATCHED, LOADED, or STORED prior to initiating the MAPPING of another data band. It is a further object of the present invention to provide a architecture which allows for the MAPPING of variable data to pre-rendered boilerplate ("pre-ripped") image bands in band RAM, while simultaneously DISPATCHING image data bands which have been MAPPED with variable bit-map data ("ripped" image data bands) to a marking engine, or while simultaneously LOADING pre-ripped image data bands from the mass storage device.

DETAILED DESCRIPTION

The present invention provides a system architecture for processing a raster page-map or bit-map for dispatching to a print engine or marking engine in a high speed printing system. The present invention also provides a computer implemented method for merging variable data into a set of page-map templets in a high speed printing system, utilizing the system architecture of the present invention. This computer implemented method can be for use with the method of implementing variable data fields with a page description language ("PDL"), described in U.S. patent application Ser. No. 08/373,582.

Figure 1:
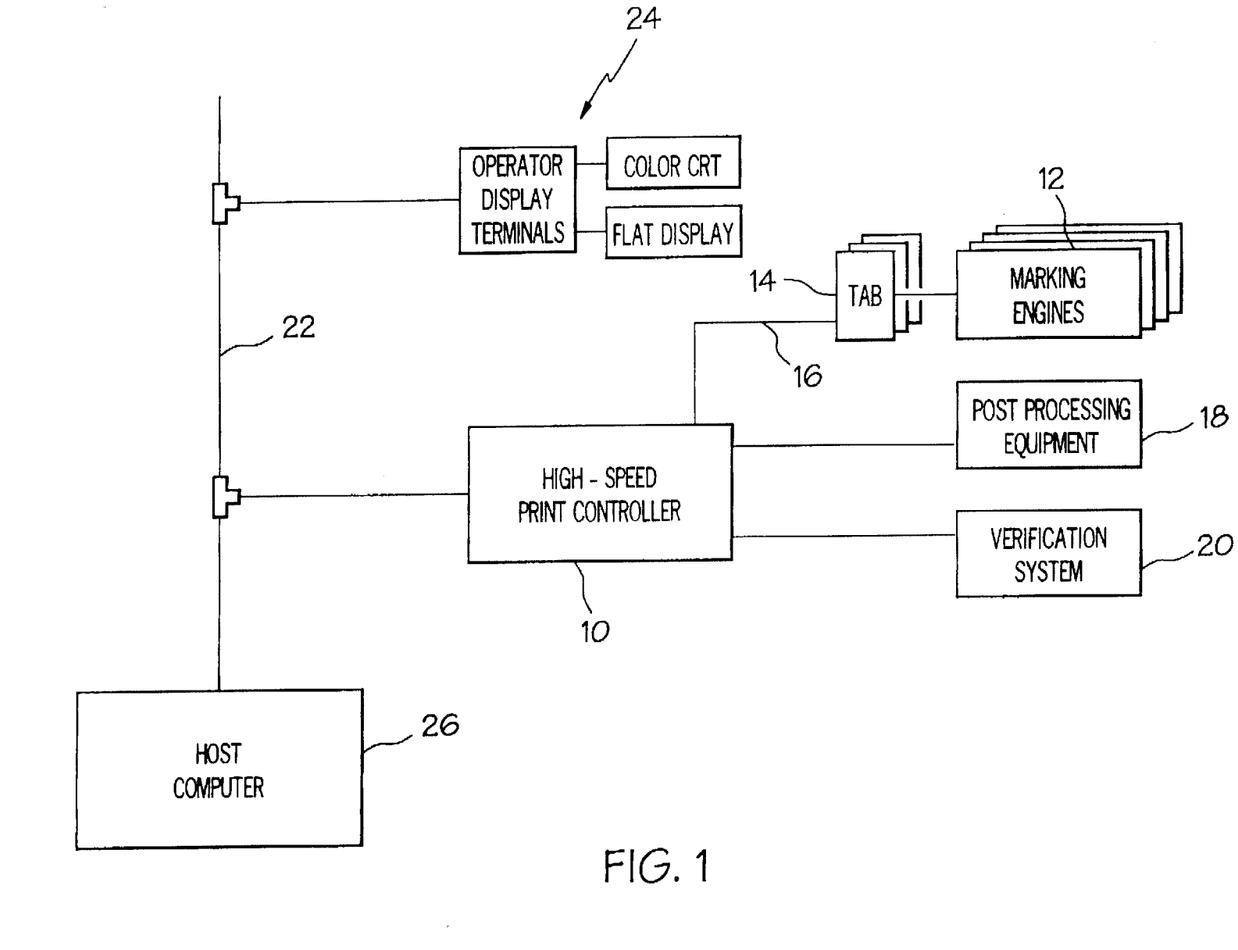
FIG. 1 is a schematic block diagram of a high speed printing system for use with the present invention.

As shown in FIG. 1, a typical high speed printing operation for utilizing the present invention includes a high speed print controller 10 for sending processed page-maps or page-map blocks to at least one raster printing marking engine 12. The high speed print controller 10 communicates with the marking engines through a target adapter board 14 ("TAB"). The high speed print controller 10 is a universal print controller, while the TAB 14 is a custom designed circuit board for translating the page-map data generated by the high speed print controller 10 to be acceptable by the various marking engines 12. The TAB 14 is situated between the high speed controller 10 and the marking engines 12 on a data bus, such as a fiber optic data bus 16.

The high speed print controller may also have outputs to post-processing equipment 18 and verification systems 20.

The high speed printing system has a communications link, such as an ethernet communications link 22, set up between an operator display 24 and a host computer 26. The host computer 26 provides the files that contain the data that is used by the high speed printing system during the printing operation. The files usually consist of: a job file, the contents of which describe all information needed to run a specific print job; an engine configuration file, the contents of which define parameters of the marking engines; the PDL file(s), the contents of which are the PDL commands (such as Postscript) that define the templates of all the printed pages; and the merge file, the contents of which contains the variable data needed to be merged into the page templates.

Figure 2:
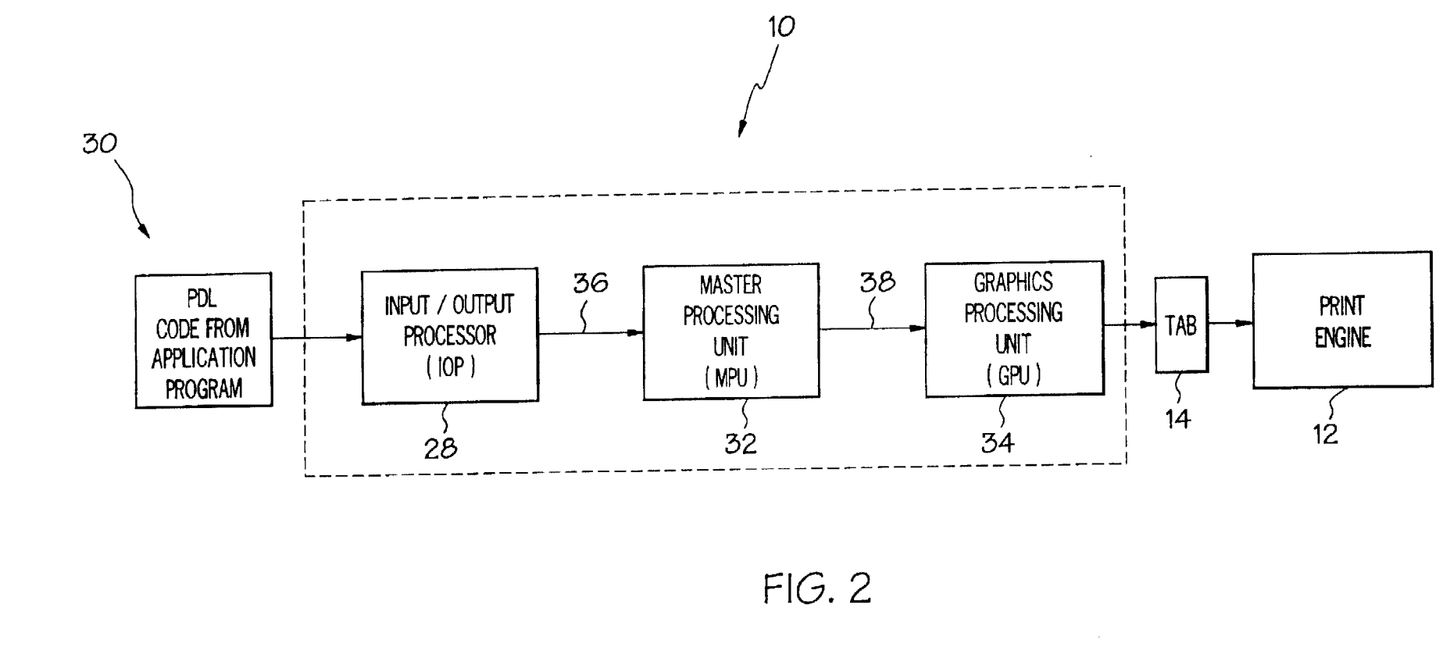
FIG. 2 is a schematic block diagram of a raster image processing system for use with the present invention.

As shown in FIG. 2 the high speed print controller 10 has a series of processing units operating in a pipeline, parallel fashion. The processing units divide the interpreting, rendering and dispatching functions, thereby accelerating the processing and dispatching of the page-maps. The processing units utilize real-time/multi-tasking software which operates asynchronously of the software in the other processing units.

The first processing unit in the pipeline is an input/output processor or "IOP" 28. This processing unit controls the input and output of data for the print operation. The IOP 28 receives a data stream 30 via the ethernet communications link 22. In addition, the IOP 28 may perform optional decompression of the data if it has been transmitted from the host computer in a compressed format.

The IOP 28 is connected to a main processing unit or "MPU" 32 which controls the rendering operations. The MPU 32 interprets the PDL data stream, generates rendering commands and orders the rendering commands in a first banding stage.

The MPU 32 is connected to a graphics processing unit or "GPU" 34, containing the architecture of the present invention. The GPU renders the page-maps in accordance to the rendering commands from the MPU 32, and executes the second-stage banding of the page-maps.

The print operation is initiated upon receipt by the IOP 28 of a data stream 30 containing the contents of a page in a page description language ("PDL") such as Postscript. Upon receipt of the data stream 30, the IOP 28 parses the data stream and transmits the resultant data stream to the MPU 32. If the data stream 30 is compressed in order to improve transmission throughput, the IOP 28 may decompress the data stream as it is delivered to the MPU 32.

The MPU 32 processes and interprets the PDL to identify objects such a text characters and symbols, and to obtain information regarding the graphics state or processing environment in which the objects are to be rendered, such as the current font being used, and the current scale and rotation to be applied. As a result of processing and interpreting the PDL, the MPU generates rendering commands which designate the object to be rendered, the graphic state to be applied and the offset address at which the rendered object is to be placed by the GPU into the page-map.

In addition to interpreting the data stream 30, the MPU 28 performs first stage banding, or partitioning the page into a number of non-overlapping geographic regions or bands. The first-stage banding performed by the MPU is a computer implemented method described in detail in the U.S. patent application, Ser. No. 08/379,735.

The GPU 34 accesses the rendering commands 38 sent by the MPU 32 and generates bit-maps for the text characters and symbols in accordance with the graphics state attributes specified in the commands in a conventional manner. In addition to the instructions to the GPU to render and merge an object, the MPU 32 may instruct the GPU 34 to pre-render specific pictures or characters according to the designated graphic state, and store the pre-rendered ("pre-ripped") bit-maps in a separate mass storage device 40 (see FIG. 3) for future processing. When the pre-ripped bit-maps are required, the MPU 32 issues a command to the GPU 34 specifying the address at which to merge the preripped bit-map with a present bit-map in creating the page-map. In accordance with the present invention, the GPU provides an architecture for performing second stage banding operations on the page-map to speed the processing and dispatching of the image.

As mentioned earlier, the MPU 32 performs a first-stage banding of a page. It performs this by defining each drawn entity (such as a font character, glyph, an atomic graphic element) into a rendering command. Rendering commands are then sorted and ordered by geographic location of the drawn entity on the printed page. The rendering commands are ordered from the top of the printed page to the bottom. For example, if the topmost portion of drawn entity "A" is geographically located on the printed page above the topmost portion of the drawn entity "B," then the rendering command representing "A" will be sorted ahead of the rendering command "B." The ordering of the rendering commands provide a coarse, first-stage banding of the printed page.

Figure 3:
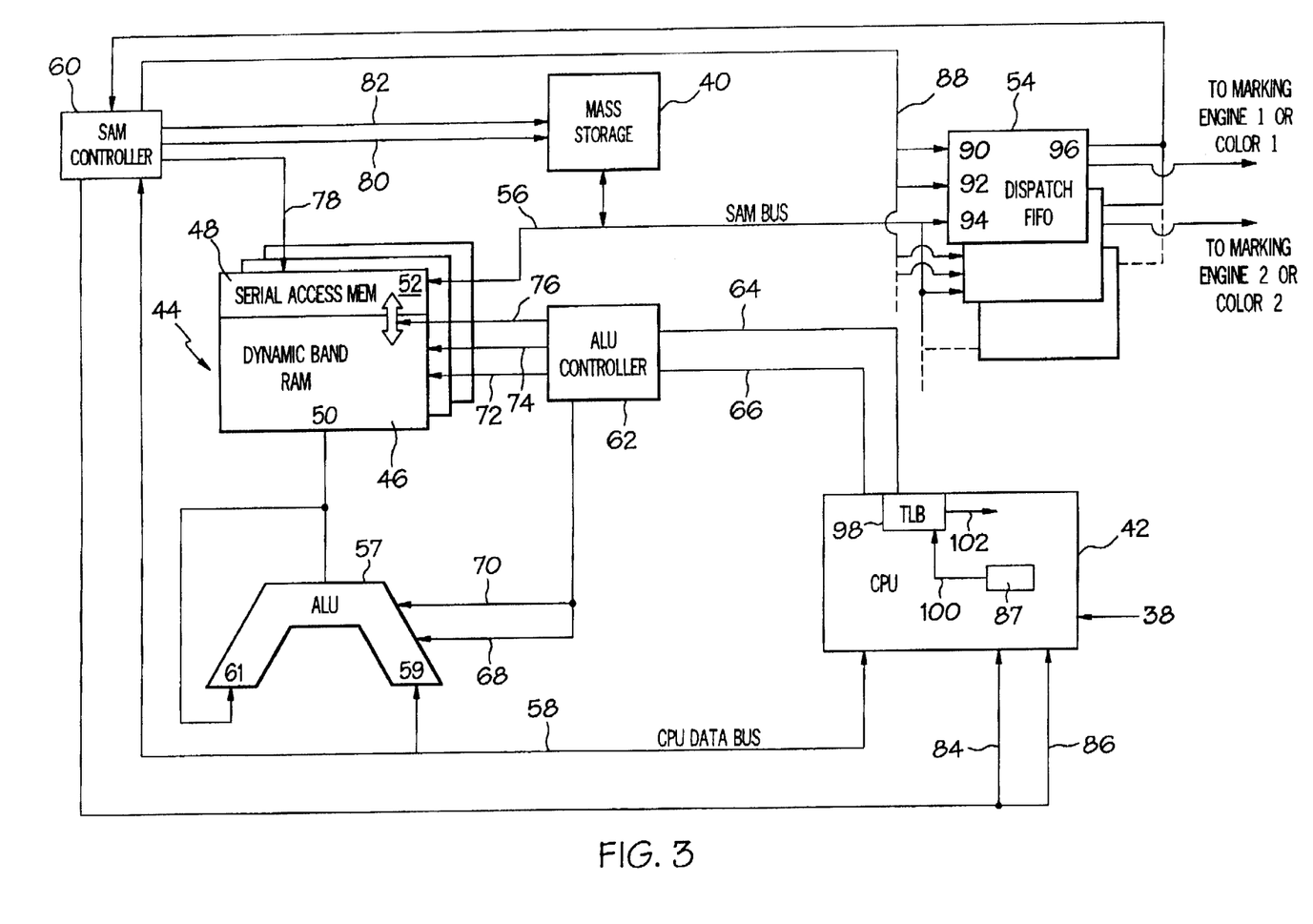
FIG. 3 is a schematic block diagram of the system architecture of the present invention.

The ordered rendering commands are then sent sequentially to the GPU 34, where fine-grain (or second-stage) banding is performed. The GPU breaks up the un-ripped "blank page," on which the bit-map of the page will be rendered, into a multitude of bands of memory. The ordered rendering commands cause the GPU to render the bit-map data from the top of the image to the bottom, which is done one band at a time. Note that a bit map for a drawn entity may span more than one image data band. Also involved in the fine-grain banding processes is the transferring or DISPATCHING of the image data bands to the marking engines 12; and the STORING and LOADING of image data bands to and from the mass storage device 40.

As shown in FIG. 3, the main components for performing the second-stage banding process are the central processing unit ("CPU") 42 and the video memory devices 44.

The video memory device 44 is essentially a dual-port memory device having a random access memory, or "band RAM" 46, and a serial access memory 48. The band RAM 46 is broken up into a multitude of segments for storing a multitude of image data bands. The preferred image band size is 8K bytes. The serial access memory 48 preferably is sized for one image data band or a fraction of an image data band (such as a half band 4K bytes). The video memory device 44 also includes a random access port 50 for providing dynamic bi-directional access to the band RAM 46, and a serial access port 52 for providing bi-directional serial access to the serial access memory 48. The video RAM devices 44 allow for bi-directional transfer of the entire contiguous block of the serial access memory 48 to and from the band RAM 46 in a single atomic operation. The operation of transferring an image data band, or fractional size thereof, between the serial access memory 48 and the band RAM 46 is referred to as "PASSING." Furthermore, the video RAM devices 44 include fully asynchronous and simultaneous, bi-directional, dual port access to the random access port 50 and to the serial access port 52. Therefore, the video RAM devices 44 allow for data transfer on the random access port 50 to be performed simultaneously with a serial data transfer on the serial access port 52.

In the preferred embodiment, the video memory device 44 comprises an array of NEC Electronics µPD482235LE, video RAM devices. The band RAM 46 storage capacity provided by the NEC µPD482235LE devices are sized for 256 8K byte image data bands or 2M bytes of RAM. The eight µPD482235LE devices provide for a serial access memory 48 size of 4 k bytes, which requires that the image data bands be transported to and from the serial access port 52 at half-band sized fractions.

The video memory devices 44 transport the image data bands, or fractional portions thereof, to the TABs 14, and subsequently to the marking engines 12, through a series of dispatch FIFOs 54 via a serial bus ("SAM" bus) 56. It is noted that, although the transfer of bands via the SAM bus is conceptually one band at a time, the hardware limitations might require (or it may simply be more desirable) that the image data bands be transported via the SAM bus 56 in fractional increments thereof. Therefore, the image data band, or the contiguous fractional portion thereof, to be transported via the SAM bus 56 is hereinafter referred to as a "band envelope." The operation of transmitting the band envelopes to the dispatch FIFO's, and subsequently to the marking engines, is referred to as "DISPATCHING." Also, for purposes of this disclosure, an "image data block" is a contiguous block of raster bit-map data which can either be an image data band or a band envelope.

A mass storage device 40 is also coupled to the SAM bus 56. The mass storage device 40 is preferably an array of Dram SIMM memory modules (equalling 4G bytes of memory), but can also be any type of memory storage device such as a hard disk, flash memory devices, CD ROM devices, disk arrays, or any combination thereof. While the size of the mass storage is limited to the CPU's 42 logical address range, the range can be expanded via an external paging mechanism. If necessary, an optional on-the-fly data compression/decompression front end interface (not shown) may be coupled between the serial access port 52 and the mass storage memory 40 on the SAM bus 56.

The mass storage 40 is provided such that band envelopes of pre-ripped image data bands can be transferred from the serial access port 52 to the mass storage via the SAM bus 56. This operation is referred to as "STORING". When a band envelope of a pre-ripped image data band, STORED in mass storage, is required for additional processing in band RAM storage (i.e. merging variable data into the pre-ripped image data band), the band envelope is transferred back to the serial access port 52. This operation is referred to as "LOADING." After the LOADING operation the band envelope is then PASSED into band RAM 46 from the serial access memory 48.

The second stage banding operation of the GPU 34 is controlled by the CPU 42. In the preferred embodiment, the CPU is an AMD 29000 32-bit RISC CPU. An arithmetic logic unit ("ALU") 57 is preferably coupled between the central processing unit 42 and the random access port 50 of the video memory device 44 on a CPU data bus 58. Also included in the GPU architecture 34, is a SAM controller 60 and an ALU controller 62.

The dual port ALU 57 performs logical operations in hardware on CPU data transmitted over the CPU data bus 58 into CPU data-in port 59, on band RAM memory data from the random access port 50 sent to the memory-in port 61. It is also within the scope of the invention that the ALU be a triple-port (or multiple port) device, such that the ALU 57 may also have the capability to perform logical operations on data received on additional input ports (not shown), such as on tile data received from a tile register (not shown).

The ALU 57 performs read-modify-write updates to the dynamic band RAM 46 memory whenever the CPU 42 performs a data write with ALU logic mode enabled. The operation of reading, modifying, and writing bits to an image data band in the band RAM 46, by the CPU 42 and the ALU 57 is referred to as "MAPPING". Preferably, the size of each MAPPING operation is the width of the CPU data bus 58, which in the preferred embodiment is 32 bits.

The MAPPING operation, although initiated by the CPU 42 and performed by the ALU 57, is controlled by the ALU controller 62. The CPU transmits band RAM addresses 64 and control commands 66 to the ALU controller 62. The ALU controller 62, in turn sends the logic mode enable commands 68 to the ALU 57. The ALU controller also generates all random access memory controls and addresses 72, 74 sent to the video RAM device 44, and generates the data transfer control signal 76 to control the PASSING operations of band envelopes between the random access memory 46 and the serial access memory 48 in the video RAM devices The SAM controller 60 receives command signals via the CPU data bus 58 when addressed by the CPU 42. The SAM controller is responsible for transporting band envelopes, via CPU initiation, between the serial access port 52, the dispatch FIFOs 54, and the mass storage devices 40. The SAM controller controls the STORING of band envelopes from the serial access port 52 to the mass storage device 40, controls the LOADING of band envelopes from the mass storage device 40 to the serial access port 52, controls the DISPATCHING of band envelopes from the serial access port to the dispatch FIFOs 54, and also controls the DISPATCHING of band envelopes from the mass storage 40 to the dispatch FIFOs 54. In controlling the STORING, LOADING and DISPATCHING operations, the SAM controller utilizes SAM control signals 78, mass storage control signals 80, and generates mass storage addresses 82.

In the preferred embodiment, the DISPATCHING, LOADING and STORING of band envelopes occurs in one-half image data band increments, and therefore, in the preferred embodiment a band envelope is sized as one-half band. To simplify LOADING and STORING operations, page-maps may be increased in size such that the memory required for the page-map equals an exact integer multiple of image data bands. A "sub-band," an image data block smaller than a band envelope, however, is usually DISPATCHED during the "last band of printed page block move." This is because, while the band size is constant, the last band of the printed page is usually smaller than the size of a full band; and accordingly, the last band envelope of the printed page is usually smaller than a full size band envelope. The SAM controller also adds an end-of-page (EOP) framing bit to the end of the sub-band, when the sub-band is DISPATCHED to the FIFO.

The CPU commands, sent to the SAM controller 60, control the image data block move size, the block move source and destination, the mass storage start address (the start of the band envelope derived from the CPU's logical address register 87) of a block move, the EOP bit generation DISPATCH to the dispatch FIFOs, and the GO command to start the SAM controller block move operation. The SAM controller 60 is also responsible for sending interrupts to the CPU, such as the "SAM block move complete" interrupt 84 and the "dispatch FIFO half empty" interrupt 86 (as described below).

The GPU architecture 34 includes one dispatch FIFO 54 for each print engine or one FIFO for each color. The FIFO size is preferably twice the actual band envelope size. Therefore, in the preferred embodiment, the actual size of each dispatch FIFO 54 is one band since the preferred band envelope size is one-half an image data band. If the architecture were configured such that the band envelope were one image data band, then the dispatch FIFO size would be two image data bands.

Each dispatch FIFO 54 receives control signals 88, such as End-Of-Page 90 and FIFO Write 92, from the SAM controller. Band envelopes are DISPATCHED to the dispatch FIFO 54 via the SAM bus 56. The marking engine may start to retrieve a band envelope, from the dispatch FIFO when any portion of the band envelope is present in the dispatch FIFO. The dispatch FIFO 54 sends a "half empty" flag, as FIFO status 96, to the SAM controller 60, which provides the SAM controller with information for subsequent DISPATCHES. Upon receipt of an active "half empty" flag 96, the SAM controller transmits to the CPU 42 the "dispatch FIFO half empty" interrupt 86 so that the CPU knows that the FIFO(s) are prepared to receive another band envelope DISPATCH. Note that DISPATCHES to the FIFO (s) run at full SAM bandwidth and are not dependant upon the marking engine's speed. This means that the present invention can DISPATCH to the FIFO(s) whenever the FIFO(s) are ready for another band envelope, independent of the speed of the marking engines.

In the preferred embodiment the dispatch FIFOs 54 are AMD AM7203A FIFOs. If necessary, an optional data decompression device (not shown) may be coupled between the dispatch FIFOs 54 and the TABs 14.

The GPU's second stage banding architecture 34 preferably utilizes virtual memory management capabilities between the CPU 42, the video RAM devices 44 and the mass storage 40. The virtual memory mapping is controlled by a translation look aside buffer 98, which in the preferred embodiment, is contained in the CPU 42. The CPU in requesting MAPPING operations generates, through a logical address register 87, logical addresses 100 to the mass storage device 40 which are intercepted by the TLB 98. The TLB has a translation table which contains a translation of the logical addresses of the mass storage device to the physical addresses in the band RAM 46 in the video memory devices 44. Every time a band envelope is LOADED from mass storage 40 into the band RAM 46, the translation table in the translation look aside buffer 98 is updated to provide a physical translation for the logical address of the band envelope which was loaded to the dynamic band RAM 46. Therefore, the CPU merely addresses to the mass storage device 40 while the TLB 98 performs the actual physical addressing operations. If the CPU addresses a band envelope in which the translation table does not have a translation (which means that the band envelope accessed by the CPU has not been LOADED into the dynamic band RAM), the TLB will generate a page fault 102 indicating that the CPU must initiate a LOADING operation for that particular data image band to the SAM controller 60. Once the LOADING operation is complete the translation table in the TLB 98 will be updated and the CPU will be provided physical access to that band envelope in the dynamic band RAM 46. Therefore because of this virtual memory management system, the CPU is free to concentrate on the MAPPING operations, while off-loading the STORING, DISPATCHING and LOADING operations to the SAM controller 60.

In the preferred embodiment, the SAM controller 60 is a custom designed ASIC device, however, it is within the scope of the invention that the SAM controller may be any micro-controller, microprocessor, custom designed device, or circuit. Preferably, the SAM controller is designed or programmed to operate as generally depicted in the flow diagram of FIG. 4.

Figure 4:
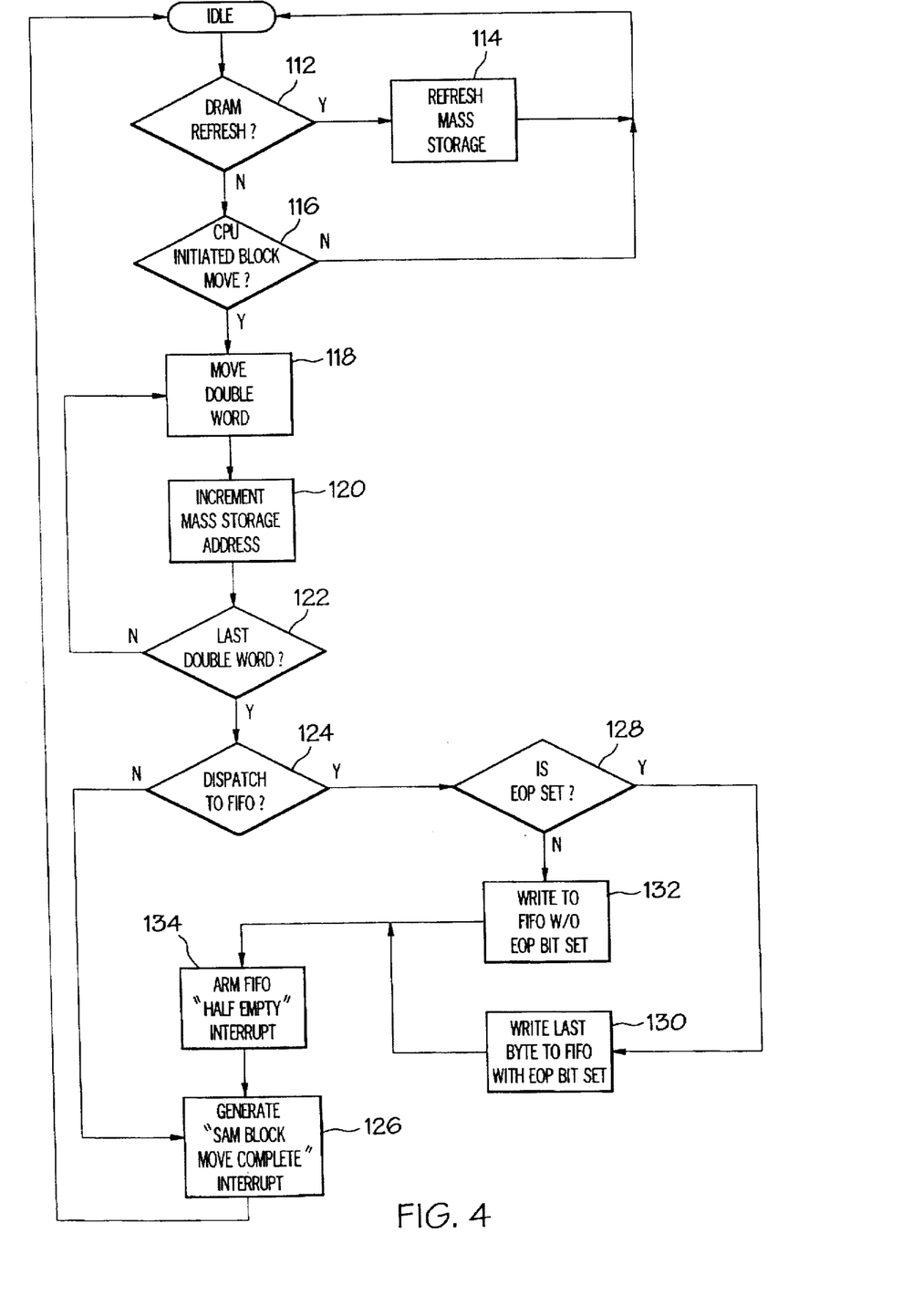
FIG. 4 is a flow diagram of the operation of the SAM controller of the present invention.

As shown in FIG. 4, in Step 110, the SAM Controller 60 is in an idle state. In this idle state, the SAM Controller is waiting for a CPU "image data block move" command to be transmitted to the SAM Controller over the CPU data bus 58. Prior to an "image data block move" command, the CPU will specify "block move source/destination," "block move size," "mass storage start address of band," and "EOP frame bit for dispatch FIFO." Periodically, while in this idle state, the SAM controller may perform a "DRAM refresh" to mass storage 40 by advancing to Step 114, and upon completion, will return to Step 110. If, while in the idle state, the CPU sends a command, then in Step 116, the SAM Controller determines whether the CPU command is for a CPU initiated image data block move. If not, the SAM controller returns to the idle state 110. Otherwise, the SAM Controller advances to Step 118.

Step 118 begins a continuous operation, or loop, for performing transfers double-words (or whatever data transfer size the hardware allows) of the image data blocks until the entire image data block is transferred. Depending upon the source and destination specified prior to the "image data block move" command, this block move can be either a LOADING, STORING or DISPATCHING operation. In Step 118, the SAM Controller moves a double-word of data between the source and destination. In Step 120, if the mass storage device 40 is included in the data transfer operation, the SAM Controller increments the mass storage address. Step 122 determines if the double word transferred by the SAM Controller is the last double word. If not, the SAM Controller operation loops to Step 118 to perform the next double-word transfer. Therefore, Steps 118–122 will be repeated until the last double-word of the image data block has been transferred.

When Step 122 determines that the SAM Controller has moved the last double-word, the SAM Controller advances to Step 124 to determine whether the SAM Controller is dispatching to the FIFOs 54. If not dispatching to the FIFOs 54, the SAM Controller advances to Step 126 which generates the SAM block move complete interrupt 84 which is sent to the CPU. Otherwise, if the SAM Controller is dispatching to the FIFO 54, the SAM Controller in Step 128 next determines whether the EOP bit is set. If the EOP bit is set, the SAM Controller moves onto Step 130 which writes the last byte to the FIFO with the EOP bit set. If the EOP bit is not set in Step 128, the SAM Controller moves on to Step 132 to write the last byte to the FIFOs 54 without the EOP bit set. After Step 130 or Step 132, the SAM Controller has dispatched an entire band envelope to the dispatched FIFOs 54; thus, in Step 134, the SAM Controller arms the FIFO half empty interrupt 86. The SAM Controller then moves onto Step 126 to generate the SAM block move complete interrupt 84; and subsequently, returns to the idle state, step 110.

In the preferred embodiment, the ALU controller 62 is a custom designed ASIC device, although the ALU controller may be any micro-controller, microprocessor, custom designed device, or circuit. Preferably, the ALU controller is designed or programmed to operate as generally depicted in the flow diagram of FIG. 5.

Figure 5:
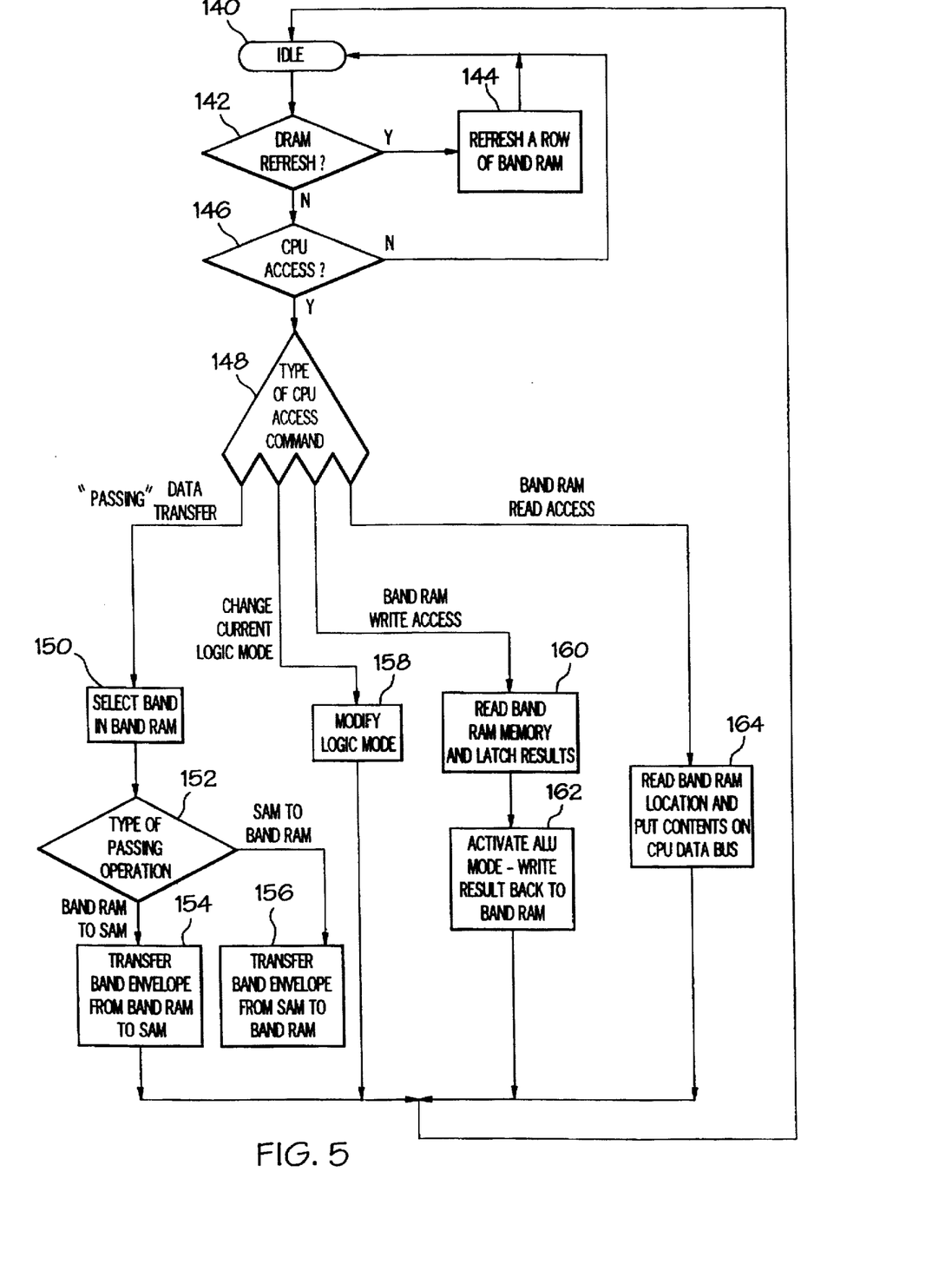
FIG. 5 is a flow diagram of the operation of the ALU controller of the present invention.

As shown in FIG. 5, in the idle state, Step 140, the ALU Controller 62 waits for a CPU command from the CPU control line 66. Periodically, while in this idle state, the ALU controller may perform a "a Band RAM refresh" to band RAM 46 by advancing to Step 144, and upon completion, will return to Step 140.

If, in Step 142, the ALU Controller determines that a "band RAM refresh" is not required, the ALU Controller advances to Step 146 to determine whether a CPU command is pending. If not, the ALU Controller returns to Step 140; on the other hand, if there is a "CPU access" command pending, then in Step 148, the ALU Controller determines whether the "CPU access" command is for one of the following: a PASSING operation, a "change current logic mode" operation, a "band RAM write access" command or a "band RAM read access" command.

If the CPU command, in Step 148, is for a PASSING operation, the ALU Controller advances to Step 150, in which the particular band as specified by the CPU command is selected in band RAM 46. In Step 152, the ALU Controller determines whether the PASSING operation is from band RAM 46 to serial access memory 48, or whether the PASSING operation is from the serial access memory 48 to band RAM 46. If the former, the ALU Controller advances to Step 154 to PASS the image data envelope from band RAM 48 to the serial access memory 48; however, if the latter, the ALU Controller advances to Step 156 to transfer the image data envelope from serial access memory 48 to band RAM 46. Upon completion of Steps 150 or 156, the ALU Controller returns to the idle state, Step 140.

If, in Step 148, the ALU Controller determines that the "CPU access" command is a "change current logic mode" command; then in Step 158, the ALU Controller modifies the current logic mode and then returns to the idle state in Step 140.

If, in Step 148, the ALU Controller determines that the "CPU access" command is a "band RAM write access" command, the ALU Controller advances to Step 160 to read a 32-bit word from band RAM memory 146 and to latch the results of the read. Then, in Step 162, the ALU Controller activates the ALU logic mode and performs a logic operation specified by the current logic mode on the latched data read from Band RAM. This logic operation can be performed using data on the CPU data bus and/or using data read from an optional third port, such as a tile register. Upon completion of the logic operation, the ALU controller returns the result of the logic operation into band RAM 46. After Step 162, the ALU Controller returns to the idle state in Step 140.

Finally, if in Step 148, the ALU Controller determines that the "CPU access command" was for a "band RAM read access" command, the ALU Controller will advance to Step 164. In Step 164, the ALU Controller reads the contents of a band RAM location in band RAM 46 and transfers the contents onto the CPU data bus 58 for reading by the CPU. After Step 164, the ALU Controller returns to the idle state in Step 140.

The system architecture of the present invention therefore allows the CPU 42 to perform rendering or MAPPING operations on page-map images "on the fly" in band RAM 46, while simultaneously DISPATCHING a completed or rendered band envelope to the marking engine via the dispatch FIFO 54. The architectural advantage of this invention is that the DISPATCHING from the serial access port 52 is occurring in parallel, and simultaneous to, the MAPPING of image data bands in the band RAM 46. Another architectural advantage of the present invention is, with the inclusion of the mass storage 40, the CPU has the ability to initiate DISPATCHES from the serial access port 52 to either the mass storage 40 or the dispatch FIFO 54; and furthermore, the CPU has the ability to initiate LOADING of band envelopes from the mass storage 40 to the serial access port, and has the ability to initiate STORING of band envelopes from the serial access memory to the mass storage. The ability, provided by the architecture, to enable the CPU to initiate DISPATCHING, LOADING, and STORING operations utilizing a mass storage device 40; and the ability, provided by the architecture, for the DISPATCHING, LOADING, and STORING operations to be occurring in parallel with the MAPPING operation; enables the CPU to merge variable bit-map data into boilerplate page-maps at very high speeds, thus creating a "variable postscript high speed printing controller."

A method for utilizing the architecture of the present invention to merge variable bit-map data with boilerplate pagemaps can be illustrated by way of example. In this example, suppose the print operation is to merge variable images to a set of ten pre-printed forms. A job file containing all the rendering information (either the rendering commands or the PDL file) to generate the 10 boiler-plate forms, having separate areas defined for adding the variable images, is first transmitted to the CPU. Also available to the CPU is a file which defines all of the variable information to be merged into the boilerplate page-maps, such as a data base having addresses, names, or other information particular to a certain party of client; and may also contain particular engine perimeters, i.e., printer specific commands such as the width, resolution, color, etc. of the variable images.

The CPU will first build the bit-maps in band RAM 46 for the boilerplate page-maps in accordance with the rendering commands in a conventional manner. It is noted that if the CPU is to be transmitted the PDL file rather than the rendering commands, the CPU can be programmed to generate its own rendering commands in a conventional manner. The first boiler plate template will be rendered or MAPPED in band RAM 46, one image data band at a time. These image data bands of boilerplate data are referred to as "pre-ripped" image data bands.

Upon completion of the rendering of an image data band, the CPU will initiate the ALU controller 62 to PASS a band envelope of the pre-ripped image data band to the serial access port 48. From there, the CPU will initiate the SAM controller 62 to STORE the band envelope in mass storage 40. If the band envelope is a fraction of an entire image data band, the PASSING and STORING operations will be repeated until the entire band is stored in mass storage. Concurrently with the PASSING and STORING operations initiated by the CPU, the CPU is MAPPING the next image data band of the page-map in the band RAM 46.

Upon completion of MAPPING the first boilerplate page-map, and upon STORING the entire contents of the page-map in mass storage 40, the CPU then repeats the MAPPING and STORING operations for the next nine boilerplate pages in the same manner. It is noted here, that the architecture of the present invention allows for these MAPPING and STORING operations to be occurring in parallel.

Next, the CPU accesses files containing the variable image data information. Based on the information in this file, the CPU is informed where to the insert the variable bit map-data. Knowing the logical address in mass storage 40 where a particular pre-ripped image data band (into which variable data needs to be merged) resides, the CPU will attempt to perform a MAPPING operation on that image data band. The TLB 98 intercepts the address sent by the CPU to the ALU controller 62, to see if the particular image data band is presently located in band RAM 46. If not, the TLB will send an page fault interrupt 102 to the CPU. Upon receiving the page fault interrupt, the CPU initiates the SAM controller 60 to perform LOADING and PASSING operations to transfer the particular image data band into band RAM 46. The CPU then updates the translation table in the TLB 98 to indicate that the particular image data band is present in band RAM. It at this point when the MAPPING operation to merge the variable image data to the pre-ripped image data band is commenced.

Once the variable bit-map data is MAPPED to the particular image data band, that image data band is ready for DISPATCH to the print engine. Alternatively, the image data band may be STORED back into mass storage if desired.

The CPU merges the variable image data to the ten pre-ripped page maps as described above. Simultaneously to the MAPPING operations, the CPU is initiating DISPATCHING operations for the merged image data bands to the dispatch FIFO 54. Furthermore, if there is a pre-ripped image data band in which no variable data needs to be merged to, the MAPPING operation can be bypassed and that image data band can be immediately DISPATCHED from the mass storage 40 to the dispatch FIFO 54.

Having described the invention in detail and by reference to the drawings, it will be apparent that modification and variations are possible without departing from the scope of the invention as defined in the following claims.

What is claimed is:

1. A method for merging variable image data into a template image to create a merged image and for transmitting the merged image to a print engine, the template image defined by rendering commands derived from a page description language file, the variable image data being taken from a file containing at least one list of a plurality of variable data, the method comprising the steps of:

rendering a template image in accordance with the set of rendering commands, said template image being broken into a plurality of template image data blocks and said rendering step renders said template image one of said template image data blocks at a time and deposits said template image data blocks into a dynamic RAM of a dual-port memory;

transferring said template image data blocks from said dynamic RAM to a mass storage;

retrieving said template image data blocks from said mass storage to said dynamic RAM;

logically merging variable image data from the variable image data file with said template image data blocks, one of said template image data blocks at a time, to produce a plurality of merged image data blocks, said merging step depositing said merged image data blocks into said dynamic RAM; and transmitting said merged image data blocks from said dynamic RAM to the print engine, one of said merged image data blocks at a time;

said transferring step includes a first step of passing one of said template image data blocks from said dynamic RAM to a serial access memory of said dual-port memory, followed by a step of storing said template image data block from said serial access memory to said mass storage over a serial bus;

said retrieving step includes a step of loading one of said template image data blocks from said mass storage to said serial access memory over said serial bus, followed by a second step of passing said template image data block from said serial access memory to said dynamic RAM; and said transmitting step includes a third step of passing one of said merged image data blocks from said dynamic RAM to serial access memory, followed by a step of dispatching said merged image data block from said serial access memory to a dispatch FIFO positioned on and said serial bus between said print engine and said serial access memory.

2. The method of claim 1 wherein said storing step occurs simultaneously to said rendering step.

3. The method of claim 1 wherein said loading step occurs simultaneously to said merging step.

4. The method of claim 1 wherein said dispatching step occurs simultaneously to said rendering step.

5. The method of claim 1 wherein said dispatching step occurs simultaneously to said merging step.

6. A method for merging a variable image data segment into a template image to create a merged image and for transmitting the merged image to a print engine, the template image defined by rendering commands derived from a page description language, the method comprising the steps of:

rendering a template image data block in a dynamic RAM of a dual-port memory in accordance with the rendering commands;

storing said template image data block in a mass storage;

rendering a next template image data block in said dynamic RAM in accordance with the rendering commands;

storing said next template image data block in said mass storage;

repeating said rendering and storing commands until the entire template image is rendered and stored in mass storage;

loading one of said template image data blocks from said mass storage into said dynamic RAM;

merging a portion of the variable image data segment into said template image data block to produce a merged image data block;

loading a next one of said template image data blocks from said mass storage into said dynamic RAM;

dispatching said merged image data block from dynamic RAM to the print engine;

merging a next portion of the variable image data segment into said next template image data block to produce a merged image data block; and repeating said loading, dispatching and merging steps at least until the entire variable image data segment is merged into said template image and all of the merged image data blocks are dispatched to the print engine.

7. The method of claim 6 wherein said rendering and storing steps are performed substantially simultaneously.

8. The method of claim 6 wherein said merging and dispatching steps are performed simultaneously.

9. The method of claim 6 wherein:

said rendering and storing steps are performed simultaneously; and said rendering and dispatching steps are performed simultaneously.

10. The method of claim 6 wherein:

the variable image data segment is one of a plurality of variable image data segments; and said loading, dispatching and merging steps are repeated until each of said plurality of variable image data segments is merged into said template image and dispatched to the print engine, such that a corresponding plurality of merged images are printed.

11. A method for merging variable image data into a template image to create a merged image and for transmitting the merged image to a print engine, the template image defined by rendering commands derived from a page description language file, the variable image data being taken from a file containing at least one list of a plurality of variable data items, the method comprising the steps of:

rendering a template image in accordance with the set of rendering commands, said template image being broken into a plurality of template image data blocks and said rendering step renders said template image one of said template image data blocks at a time and deposits said template image data blocks into a dynamic RAM of a dual-port memory;

transferring said template image data blocks from said dynamic RAM to a mass storage;

retrieving a first one of said template image data blocks from said mass storage to said dynamic RAM;

logically merging variable image data from the variable image data file with said first one of said template image data blocks to produce a merged image data block, said merging step depositing said merged image data block into said dynamic RAM;

transmitting said merged image data block from said dynamic RAM to the print engine; and transmitting a second one of said template image data blocks from said mass storage to said print engine.

12. A method for rendering and printing an image defined by rendering commands derived from a page description language, the method comprising the steps of:

a first rendering step of rendering a first image data block in a dynamic RAM of a dual-port memory in accordance with the rendering commands to produce a first rendered image data block;

passing said first rendered image data block to a serial access memory of said dual-port memory;

dispatching said first rendered image data block from said serial access memory to a serial bus operatively coupled to a print engine; and a second rendering step of rendering a second image data block in said dynamic RAM in accordance with the rendering commands to produce a second rendered image data block;

said second rendering step being performed simultaneously with said dispatching step.

13. The method of claim 12, wherein said dispatching step includes the step of sending said first rendered image data block over said serial bus to a dispatch FIFO operatively coupled between said serial bus and said print engine.

14. The method of claim 12, wherein said first and second rendering steps include a read-modify-write step performed on said first and second image data blocks, respectively, by an arithmetic logic unit.

* * * * *

UNITED STATES PATENT AND TRADEMARK OFFICE
CERTIFICATE OF CORRECTION

PATENT NO. : 5,740,338
DATED : April 14, 1998
INVENTOR(S) : Forrest P. Gauthier et al.

It is certified that error appears in the above-identified patent and that said Letters Patent is hereby corrected as shown below:

Claim 1, Col. 12, Line 31 - first occurrence of word "and" should be omitted.

Signed and Sealed this

Ninth Day of June, 1998

Attest:

BRUCE LEHMAN

*Attesting Officer*     *Commissioner of Patents and Trademarks*